No. 708,426. Patented Sept. 2, 1902.
J. B. TAIT.
SULKY.
(Application filed Apr. 25, 1902.)
(No Model.)
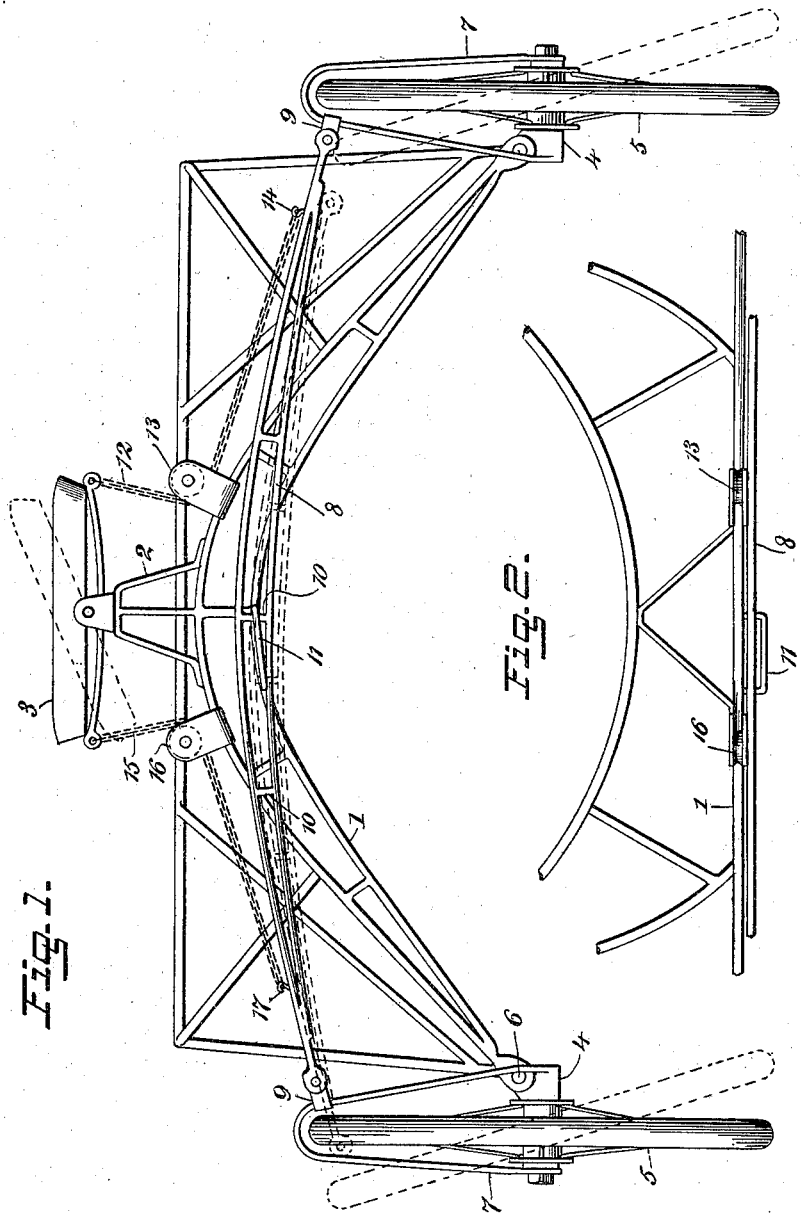
WITNESSES:
James F. Duhamel
C. R. Ferguson
INVENTOR
John B. Tait
BY
Munn
ATTORNEYS.

UNITED STATES PATENT OFFICE.

JOHN BLACKFAN TAIT, OF HIGHBRIDGE, NEW JERSEY.

SULKY.

SPECIFICATION forming part of Letters Patent No. 708,426, dated September 2, 1902.

Application filed April 25, 1902. Serial No. 104,643. (No model.)

*To all whom it may concern:*

Be it known that I, JOHN BLACKFAN TAIT, a citizen of the United States, and a resident of Highbridge, in the county of Hunterdon and State of New Jersey, have invented a new and Improved Sulky, of which the following is a full, clear, and exact description.

This invention relates to improvements in racing-sulkies, the object being to provide a sulky with the wheels so arranged as to have a lateral swinging or tilting motion with relation to the sulky-axle, so as to prevent side slipping of the vehicle while turning curves and incidentally relieving the wheels of considerable lateral strain.

I will describe a sulky embodying my invention and then point out the novel features in the appended claims.

Reference is to be had to the accompanying drawings, forming a part of this specification, in which similar characters of reference indicate corresponding parts in both figures.

Figure 1 is a rear elevation of a sulky embodying my invention, and Fig. 2 is a plan view of a portion thereof.

Referring to the drawings, 1 designates the curved or arched axle, on the upper portion of which is a standard 2, and on this standard the driver's seat 3 is pivoted so as to swing downward toward one side of the sulky. The spindles 4 for the wheels 5 are pivotally connected, as at 6, to the lower ends of the axles, and yokes 7 connect with the inner and outer ends of the spindles and pass up over the wheels, and the upper ends of the opposite yokes are connected to a shifting bar 8. The said shifting bar, as here shown, is pivoted to clips 9, attached to the yokes. The shifting bar for the purpose of strength may be also arched, and it is made in upper and lower sections connected by vertical posts 10. The center vertical post 10 passes through a loop 11, attached to the axle, and therefore the longitudinal movement of the shifting bar is limited by the center post 10, engaging with an end wall of the loop. A chain 12 is connected to one side of the seat 3 and passes around a pulley 13, supported on the axle 1, and is connected at its outer end with the draw-bar 8, as indicated at 14. From the opposite side of the seat a chain 15 extends around a pulley 16, supported on the axle, and is connected to the draw-bar, as at 17.

In operation when the vehicle is traveling on a straight course the driver will sit upright or practically so, which holds the seat 3 in substantially horizontal position, and consequently holds the wheels in normal vertical position. Upon turning a curve, however, the driver naturally swings his body inward, and this movement of the body causes the rocking of the seat, and through the medium of the chains 12 and 15 the spindles will be rocked or swung on the axle so that the wheels assume the position indicated by dotted lines in Fig. 1, the lower portions of the wheels being inclined toward the outer side of the track, and thus slipping is practically prevented. Upon again reaching a straight course the driver by straightening his body brings the wheels back to normal position.

Having thus described my invention, I claim as new and desire to secure by Letters Patent—

1. In a sulky, an axle, wheel-spindles having swinging connection with the axle, yokes extended upward from the spindles, a shifting bar connecting with said yokes, a rocking seat on the axle, connections between said seat and said bar, a post carried by the bar, and a loop on the axle through which said post passes, substantially as specified.

2. In a sulky, an axle, wheel-spindles pivoted to the axle, yokes extended upward from the spindles, a shifting bar having pivotal connection with said yokes, a seat mounted to rock on the axle, pulleys supported on the axle, and chains extended from the opposite sides of the seat around said pulleys and connected with opposite ends of the shifting bar, substantially as specified.

In testimony whereof I have signed my name to this specification in the presence of two subscribing witnesses.

JOHN BLACKFAN TAIT.

Witnesses:
  WM. F. LATIMER,
  L. N. ALLER.